United States Patent
Minamoto et al.

(10) Patent No.: US 11,795,404 B2
(45) Date of Patent: Oct. 24, 2023

(54) COMPOSITION FOR REMOVING SULFUR-CONTAINING COMPOUNDS

(71) Applicant: KURARAY CO., LTD., Kurashiki (JP)

(72) Inventors: Naoya Minamoto, Kamisu (JP); Yuusuke Saitou, Kamisu (JP); Takuo Tsuruta, Chiyoda-ku (JP)

(73) Assignee: KURARAY CO., LTD., Kurashiki (JP)

( * ) Notice: Subject to any disclaimer, the term of this patent is extended or adjusted under 35 U.S.C. 154(b) by 334 days.

(21) Appl. No.: 16/975,322

(22) PCT Filed: Feb. 20, 2019

(86) PCT No.: PCT/JP2019/006305
§ 371 (c)(1),
(2) Date: Aug. 24, 2020

(87) PCT Pub. No.: WO2019/167752
PCT Pub. Date: Sep. 6, 2019

(65) Prior Publication Data
US 2021/0032548 A1 Feb. 4, 2021

(30) Foreign Application Priority Data
Feb. 28, 2018 (JP) ................................. 2018-035746

(51) Int. Cl.
*C10G 29/24* (2006.01)
*B01D 53/52* (2006.01)
*C10L 3/10* (2006.01)

(52) U.S. Cl.
CPC ............ *C10G 29/24* (2013.01); *B01D 53/52* (2013.01); *C10L 3/103* (2013.01); *B01D 2257/304* (2013.01); *B01D 2257/306* (2013.01); *B01D 2258/012* (2013.01); *B01D 2258/018* (2013.01); *B01D 2258/05* (2013.01); *C10G 2300/202* (2013.01); *C10G 2300/207* (2013.01); *C10L 2290/44* (2013.01); *C10L 2290/545* (2013.01)

(58) Field of Classification Search
None
See application file for complete search history.

(56) References Cited

U.S. PATENT DOCUMENTS

| | | | |
|---|---|---|---|
| 3,459,852 A | | 8/1969 | Roehm |
| 4,217,237 A | * | 8/1980 | Sartori ............... B01D 53/1493 423/232 |
| 4,680,127 A | | 7/1987 | Edmondson |
| 5,152,916 A | | 10/1992 | Hoffmann et al. |
| 5,169,411 A | | 12/1992 | Weers |
| 5,284,576 A | | 2/1994 | Weers et al. |
| 5,698,171 A | * | 12/1997 | Trauffer ............... B01D 53/52 423/220 |
| 2009/0065445 A1 | | 3/2009 | Westlund et al. |
| 2012/0060686 A1 | | 3/2012 | Kortunov et al. |
| 2012/0061614 A1 | | 3/2012 | Calabro et al. |
| 2012/0063977 A1 | | 3/2012 | Baugh et al. |
| 2012/0063978 A1 | | 3/2012 | Baugh et al. |
| 2012/0063979 A1 | | 3/2012 | Kortunov et al. |
| 2012/0063980 A1 | | 3/2012 | Kortunov et al. |
| 2013/0336914 A1 | | 12/2013 | Horenziak et al. |
| 2014/0033919 A1 | | 2/2014 | Deckman et al. |
| 2015/0314235 A1 | | 11/2015 | Kortunov et al. |
| 2016/0038872 A1 | | 2/2016 | Calabro et al. |
| 2017/0081597 A1 | | 3/2017 | Fuji et al. |
| 2018/0010056 A1 | | 1/2018 | Suzuki et al. |
| 2018/0030360 A1 | * | 2/2018 | Trevino .................... C02F 1/20 |
| 2018/0223204 A1 | * | 8/2018 | Hu ...................... B01D 53/1425 |
| 2019/0322948 A1 | * | 10/2019 | Begeal ............... B01D 53/1468 |
| 2020/0071625 A1 | * | 3/2020 | Guillou .................. C10G 45/08 |

FOREIGN PATENT DOCUMENTS

| | | | |
|---|---|---|---|
| CN | 101676018 A | 3/2010 | |
| CN | 103402606 A | 11/2013 | |
| CN | 104364359 A | 2/2015 | |
| CN | 106540515 A | 3/2017 | |
| CN | 109722271 A | 5/2019 | |
| WO | WO-9725126 A2 * | 7/1997 | ............. B01D 53/48 |
| WO | WO 2015/141535 A1 | 9/2015 | |
| WO | WO 2016/121747 A1 | 8/2016 | |
| WO | WO 2018/003623 A1 | 1/2018 | |
| WO | WO-2018097108 A1 * | 5/2018 | ............. B01D 53/14 |

OTHER PUBLICATIONS

"Principles of Organic Acids and Bases" (with English Translation),1991,12 pages.
GC Office Action dated May 16, 2020 in corresponding GCC Patent Application No. GC 2019/37091.
International Search Report dated May 21, 2019 in PCT/JP2019/006305 filed on Feb. 20, 2019, 2 pages.
Extended European Search Report dated Oct. 12, 2021 in European Patent Application No. 19760189.1, 9 pages.
Thilgen, C., "pK A—Werte ausgewählter Vertreter verschiedener Verbindungsklassen", Retrieved from the internet: URL: https://web.archive.org/web/20120522144843if_/http://www.diederich.chem.ethz.ch:80/feach/pKa_Table.pdf [retrieved on Sep. 23, 2021], May 22, 2012, XP055844108, 2 pages.
Anonymous: "Diazabicycloundecen—Wikipedia", Retrieved from the internet: URL:https://web.archive.org/web/20170115005552/https://de.wikipedia.org/wiki/Diazabicycloundecen [retrieved on Sep. 23, 2021], Jan. 15, 2017, XP055844104, pp. 1-3.
Combined Chinese Office Action and Search Report dated Jun. 23, 2021 in Chinese Patent Application No. 201980015046.1 (with English translation of Categories of Cited Documents), 9 pages.

* cited by examiner

*Primary Examiner* — Tam M Nguyen
(74) *Attorney, Agent, or Firm* — Oblon, McClelland, Maier & Neustadt, L.L.P.

(57) ABSTRACT

Provided is a composition for removing a sulfur-containing compound contained in at least one of a liquid and gas, the sulfur-containing compound being at least one selected from the group consisting of hydrogen sulfide and an —SH group-containing compound, the composition containing an aldehyde and an amine whose conjugate acid has a pKa value of 11.3 or higher in water at 25° C.

9 Claims, No Drawings

COMPOSITION FOR REMOVING SULFUR-CONTAINING COMPOUNDS

TECHNICAL FIELD

The present invention relates to a composition for removing a sulfur-containing compound contained in at least one of a liquid and gas.

BACKGROUND ART

Hydrocarbons in fossil fuel, purified petroleum products, and the like, such as natural gas, liquefied natural gas, sour gas, crude oil, naphtha, heavy aromatic naphtha, gasoline, kerosene, diesel oil, light oil, heavy oil, FCC slurry, asphalt, oil field condensate, often contain sulfur-containing compounds, such as hydrogen sulfide and various —SH group-containing compounds (typically various mercaptans).

Among them, the toxicity of hydrogen sulfide is well known, and in the industry that deals with fossil fuel and purified petroleum products, considerable costs and efforts are paid for reducing the content of hydrogen sulfide to a safe level. For example, for pipeline gas, a hydrogen sulfide content of not more than 4 ppm by mass is required as an ordinary regulatory value.

Hydrogen sulfide and various —SH group-containing compounds tend to leak into the atmosphere because of the volatility thereof. Thus, offensive odors of the compounds are often problematic in and around the storage site of the hydrocarbon, and the pipeline and the shipping system therefor. In addition, hydrogen sulfide and various —SH group-containing compounds may exist in water in sewage or the like, and offensive odors derived therefrom are also often problematic.

For solving such problems due to sulfur-containing compounds as described above, Patent Documents 1 and 2 propose methods of removing hydrogen sulfide using acrolein and the like. However, the methods have also been insufficient in the removal efficiency of a sulfur-containing compound, such as hydrogen sulfide, and there has been a room for improvement.

CITATION LIST

Patent Literature

[Patent Document 1] U.S. Pat. No. 4,680,127
[Patent Document 2] U.S. Pat. No. 3,459,852

SUMMARY OF THE INVENTION

Technical Problem

An object of the present invention is to provide a composition excellent in removal efficiency of a sulfur-containing compound (at least one selected from the group consisting of hydrogen sulfide and an —SH group-containing compound, the same also applies hereinafter) contained in at least one of a liquid and gas.

Solution to Problem

As a result of intensive and extensive studies, the present inventors have found that removal efficiency of a sulfur-containing compound contained in at least one of a liquid and gas is improved, as compared with the case of using an aldehyde alone, by using an aldehyde in combination with an amine whose conjugate acid has a pKa value of 11.3 or higher in water at 25° C., thereby completing the present invention.

Specifically, the configuration of the summary of the present invention is as follows.

[1] A composition for removing a sulfur-containing compound contained in at least one of a liquid and gas, the sulfur-containing compound being at least one selected from the group consisting of hydrogen sulfide and an —SH group-containing compound, the composition containing an aldehyde and an amine whose conjugate acid has a pKa value of 11.3 or higher in water at 25° C.

[2] The composition according to the above [1], wherein the amine contains at least one of a compound represented by the general formula (1) and a compound represented by the general formula (2):

[Chem. 1]

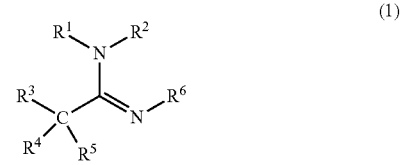

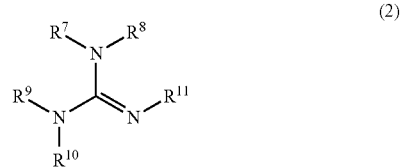

wherein $R^1$ to $R^{11}$ each independently represent a hydrogen atom or an alkyl group having 1 to 5 carbon atoms, provided that $R^1$, $R^2$, $R^7$, and $R^8$ may be connected to $R^3$, $R^6$, $R^9$, and $R^{11}$, respectively, to form an alkylene group having 2 to 6 carbon atoms.

[3] The composition according to the above [2], wherein the compound represented by the general formula (1) is at least one of 1,8-diazabicyclo[5.4.0]-7-undecene (DBU) and 1,5-diazabicyclo[4.3.0]-5-nonene (DBN).

[4] The composition according to the above [2], wherein the compound represented by the general formula (2) is at least one selected from the group consisting of guanidine, 1,1,3,3-tetramethylguanidine (TMG), 1,5,7-triazabicyclo[4.4.0]dec-5-ene (TBD), and 7-methyl-1,5,7-triazabicyclo[4.4.0]dec-5-ene (MTBD).

[5] The composition according to any one of the above [1] to [4], wherein the aldehyde is an α, β-unsaturated aldehyde.

[6] The composition according to the above [5], wherein the α, β-unsaturated aldehyde is at least one selected from the group consisting of acrolein, senecioaldehyde, and citral.

[7] The composition according to any one of the above [1] to [6], wherein each of the liquid and gas comprises a hydrocarbon.

[8] The composition according to any one of the above [1] to [6], wherein each of the liquid and gas is at least one selected from the group consisting of natural gas, liquefied natural gas (LNG), liquefied petroleum gas (LPG), sour gas, dry gas, wet gas, oil field gas, associated gas, tail gas, dimethyl ether, crude oil, naphtha, heavy aromatic naphtha, gasoline, kerosene, diesel oil, light oil, lubricating oil, heavy oil, A-heavy oil, B-heavy oil, C-heavy oil, jet fuel oil, FCC slurry, asphalt, condensate, bitumen, extra heavy oil, tar, gas to liquid (GTL), coal to liquid (CTL), asphaltene, aromatic hydrocarbons, alkylates, base oil, kerogen, coke, black oil, synthetic crude oil, reformed gasoline, isomerate gasoline, regenerated heavy oil, residual oil, clean oil, raffinate, wax, biomass fuel, biomass to liquid (BTL), biogasoline, bioethanol, bio-ETBE, and biodiesel.

[9] A method of removing a sulfur-containing compound contained in at least one of a liquid and gas,
the sulfur-containing compound being at least one selected from the group consisting of hydrogen sulfide and an —SH group-containing compound,
the method including bringing the at least one of the liquid and gas into contact with the composition according to any one of the above [1] to [8].

[10] The method according to the above [9], wherein the sulfur-containing compound is brought into contact with the composition in the range of −30° C. to 150° C.

[11] Use of the composition according to any one of the above [1] to [8] for removing a sulfur-containing compound contained in at least one of a liquid and gas,
the sulfur-containing compound being at least one selected from the group consisting of hydrogen sulfide and an —SH group-containing compound.

Advantageous Effects of Invention

The present invention can provide a composition excellent in removal efficiency of a sulfur-containing compound contained in at least one of a liquid and gas.

DESCRIPTION OF EMBODIMENTS

The composition of the present invention is a composition for removing a sulfur-containing compound contained in at least one of a liquid and gas, the composition being characterized by containing an aldehyde and an amine having a pKa value of 11.3 or higher.

Here, the "sulfur-containing compound" is at least one selected from the group consisting of hydrogen sulfide and —SH group-containing compounds. The "pKa value" of an amine is an acid dissociation constant (pKa) value of the conjugate acid in water at 25° C. The same applied hereinafter unless otherwise defined.

The composition of the present invention is excellent in removal efficiency of a sulfur-containing compound contained in at least one of a liquid and gas (hereinafter sometimes simply referred to as "removal rate") due to containing an aldehyde and an amine having a pKa value of 11.3 or higher as active components.

The "composition" in the present invention refers to a state where an aldehyde and an amine having a pKa value of 11.3 or higher coexist in the same system. Here, the "state where an aldehyde and an amine having a pKa value of 11.3 or higher coexist in the same system" refers to a state where the aldehyde and the amine having a pKa value of 11.3 or higher are mixed in the same system, and the aldehyde and the amine having a pKa value of 11.3 or higher only have to be mixed at least at the time when they are brought into contact with at least one of a liquid and gas containing a sulfur-containing compound that is subject to the use of the composition of the present invention. That is, at a time before contact with the liquid or the like, the aldehyde and the amine having a pKa value of 11.3 or higher may exist separately as individual components, and, for example, the aldehyde and the amine having a pKa value of 11.3 or higher may be each individually added to the liquid and mixed in the liquid to thereby constitute a composition. Alternatively, before contact with the liquid or the like, the aldehyde and the amine having a pKa value of 11.3 or higher may be previously mixed to thereby constitute a composition.

The reason why the composition of the present invention is superior in removal efficiency of a sulfur-containing compound as compared with conventional sulfur-containing compound-removing agents containing an aldehyde has not been elucidated yet, but one factor is supposedly the fact that in the reaction of an aldehyde and a sulfur-containing compound, deprotonation of the sulfur-containing compound is promoted due to the existence of the amine having a pKa value of 11.3 or higher to increase the reaction rate.

The composition of the present invention is for removing a sulfur-containing compound contained in at least one of a liquid and gas.

In the present invention, for example, converting a sulfur-containing compound contained in at least one of a liquid and gas into another compound to decrease the content of the sulfur-containing compound in the liquid or gas from the initial amount is included in "removing". The converted product after conversion into another compound may remain present in the system or may be separated out of the system.

Examples of typical removal methods include a method in which at least one of a liquid and gas containing a sulfur-containing compound is brought into contact with the composition of the present invention, and then the composition after contact is separated from the liquid and gas after contact, resulting in decrease of the content of the sulfur-containing compound in the liquid or gas from the initial amount, as described later.

Although each of the liquid and gas that is subject to the use of the composition of the present invention is not limited, examples thereof include water and a hydrocarbon, with a hydrocarbon being preferred. Specific examples of each of the liquid and gas include natural gas, liquefied natural gas (LNG), liquefied petroleum gas (LPG), sour gas, dry gas, wet gas, oil field gas, associated gas, tail gas, dimethyl ether, crude oil, naphtha, heavy aromatic naphtha, gasoline, kerosene, diesel oil, light oil, lubricating oil, heavy oil, A-heavy oil, B-heavy oil, C-heavy oil, jet fuel oil, FCC slurry, asphalt, condensate, bitumen, extra heavy oil, tar, gas to liquid (GTL), coal to liquid (CTL), asphaltene, aromatic hydrocarbons, alkylates, base oil, kerogen, coke, black oil, synthetic crude oil, reformed gasoline, isomerate gasoline, regenerated heavy oil, residual oil, clean oil, raffinate, wax, biomass fuel, biomass to liquid (BTL), biogasoline, bioethanol, bio-ETBE, and biodiesel. Each of the liquid and gas may be one substance or may be two or more substances.

The sulfur-containing compound that is subject to the removal in the present invention is at least one selected from the group consisting of hydrogen sulfide and an —SH group-containing compound. That is, the compound that is subject to the removal may be only hydrogen sulfide or only an —SH group-containing compound, or may be a mixture thereof. The —SH group-containing compound is not limited, and examples thereof include a sulfur-containing compound to be classified as a mercaptan represented by a chemical formula "R—SH". Examples of mercaptans represented by the chemical formula "R—SH" include those in which R is an alkyl group, such as methyl mercaptan, ethyl mercaptan, n-propyl mercaptan, isopropyl mercaptan, n-butyl mercaptan, isobutyl mercaptan, sec-butyl mercaptan, tert-butyl mercaptan, and n-amyl mercaptan; those in which R is an aryl group, such as phenyl mercaptan; and those in which R is an aralkyl group, such as benzyl mercaptan. The —SH group-containing compound that is subject to the removal may be one compound or may be two or more compounds.

The aldehyde which is used in the present invention is not limited, and examples thereof include monoaldehydes, such as formaldehyde, acetaldehyde, propionaldehyde, butanal, pentanal, hexanal, heptanal, octanal, nonanal, decanal, and benzaldehyde; α,β-unsaturated aldehydes, such as acrolein, senecioaldehyde, and citral; and dialdehydes, such as glyoxal, malondialdehyde, succinaldehyde, glutaraldehyde, 3-methylglutaraldehyde, 1,6-hexanedial, ethylpentanedial, 1,7-heptanedial, methylhexanedial, 1,8-octanedial, methylheptanedial, dimethylhexanedial, ethylhexanedial, 1,9-nonanedial, 2-methyl-1,8-octanedial, ethylheptanedial, 1,10-decanedial, dimethyloctanedial, ethyloctanedial, dodecanedial, hexadecanedial, 1,2-cyclohexane dicarbaldehyde, 1,3-cyclohexane dicarbaldehyde, 1,4-cyclohexane dicarbaldehyde, 1,2-cyclooctane dicarbaldehyde, 1,3-cyclooctane dicarbaldehyde, 1,4-cyclooctane dicarbaldehyde, and 1,5-cyclooctane dicarbaldehyde. The aldehydes may be used alone or in combination of two or more thereof.

Among them, from the viewpoint of removal efficiency of a sulfur-containing compound, an α, β-unsaturated aldehyde is preferred, and at least one compound selected from the group consisting of acrolein, senecioaldehyde, and citral is more preferred. From the viewpoints of low toxicity, biodegradability, safety on handling, heat resistance, low metal corrosiveness, and so on, at least one compound selected from the group consisting of senecioaldehyde and citral is further preferred.

The aldehyde reacts with a sulfur-containing compound, and thus the sulfur-containing compound is removed from a liquid or gas. The mode of the reaction is not limited, and, for example, in the case where the aldehyde is an α,β-unsaturated aldehyde, a sulfur-containing compound may undergo an addition reaction on a carbon-carbon double bond. In the case of another aldehyde, a sulfur-containing compound may undergo an addition reaction on a formyl group.

An amine for use in the present invention has a pKa value of 11.3 or higher, preferably 11.4 or higher, and further preferably 11.5 or higher. By using an amine having such a pKa value, removal efficiency of a sulfur-containing compound is increased. On the other hand, when an amine having a pKa value lower than 11.3 is used, removal efficiency of a sulfur-containing compound is not sufficiently achieved.

Here, the pKa value (the value of the acid dissociation constant (pKa) of the conjugate acid in water at 25° C.) may be measured by using any appropriate measurement apparatus, and also can be known from a document, such as "CRC HANDBOOK of CHEMISTRY and PHYSICS". An example of specific measurement methods is a method in which the hydrogen ion concentration is measured with a pH meter and the pKa value is calculated from the concentration of the subject substance and the hydrogen ion concentration.

The amine having a pKa value of 11.3 or higher for use in the present invention is not limited, and for example, an amine having an amidine backbone or guanidine backbone is preferred. Specific examples thereof include a compound represented by the following general formula (1) or the following general formula (2), and a compound represented by the general formula (1) is preferred.

[Chem. 2]

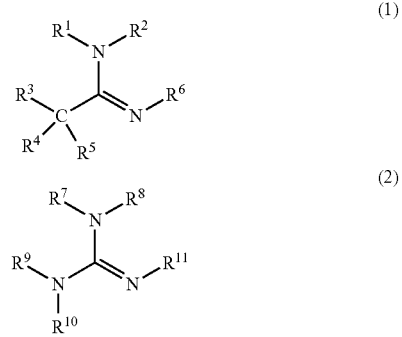

In the general formulae (1) and (2), $R^1$ to $R^{11}$ each independently represent a hydrogen atom or an alkyl group having 1 to 5 carbon atoms, provided that $R^1$, $R^2$, $R^7$, and $R^8$ may be connected to $R^3$, $R^6$, $R^9$, and $R^{11}$, respectively, to form an alkylene group having 2 to 6 carbon atoms.

Examples of the compound represented by the general formula (1) include 1,8-diazabicyclo[5.4.0]-7-undecene (DBU) and 1,5-diazabicyclo[4.3.0]-5-nonene (DBN).

Examples of the compound represented by the general formula (2) include guanidine, 1,1,3,3-tetramethylguanidine (TMG), 1,5,7-triazabicyclo[4.4.0]dec-5-ene (TBD), and 7-methyl-1,5,7-triazabicyclo[4.4.0]dec-5-ene (MTBD).

The amines may be used alone or in combination of two or more thereof.

Commercial products of the amines may be used, or the amines may be produced by a known method. As an example of known methods, DBU can be produced by cianoethylating ε-caprolactam, hydrogenating the resulting N-(2-cyanoethyl)caprolactam, and subjecting the resulting N-(3-aminopropyl)caprolactam to a cyclodehydration reaction. TMG can be produced by S-methylating and aminating tetramethylthiourea.

The total content of the aldehyde and the amine having a pKa value of 11.3 or higher in the composition of the present invention can be properly set according to the use mode. The total content may be 0.1% by mass or more, may be 10% by mass or more, may be 30% by mass or more, may be 50% by mass or more, may be 80% by mass or more, and may be 100% by mass. The total content may be 90% by mass or less, may be 60% by mass or less, may be 30% by mass or less, and may be 5% by mass or less.

As for the ratio of the content of the aldehyde and the content of the amine having a pKa value of 11.3 or higher in the composition of the present invention, when that of the aldehyde is taken as A (parts by mass) and that of the amine having a pKa value of 11.3 or higher is taken as B (parts by mass), the A/B ratio is typically 0.1/99.9 to 99.9/0.1, and from the viewpoint of cost-effectiveness, the A/B ratio is preferably 20/80 to 99.5/0.5, more preferably 40/60 to 99/1, and further preferably 41/59 to 85/15.

Unless the effects of the present invention are impaired, the composition of the present invention may further contain, in addition to the aldehyde and the amine having a pKa value of 11.3 or higher, an optional component, such as a surfactant, a corrosion inhibitor, an oxygen scavenger, an iron control agent, a crosslinking agent, a breaker, a coagulant, a temperature stabilizer, a pH adjustor, a dehydration modifier, a swelling inhibitor, a scale inhibitor, a biocide, a friction reducer, a defoaming agent, a lost circulation material, a lubricant, a clay dispersant, a weighting agent, a gelling agent, and a nitrogen-containing compound other than the amine having a pKa value of 11.3 or higher.

The composition of the present invention may contain, as an optional component, a suitable solvent, such as monoalcohols, for example, methanol, ethanol, n-propanol, 2-propanol, n-butanol, isobutanol, tert-butylalcohol, 1-pentanol, isoamyl alcohol, sec-amyl alcohol, 3-pentanol, tert-amyl alcohol, 3-methyl-3-methoxy-1-butanol, 3-methoxy-1-butanol, 3-methyl-3-buten-1-ol, prenol, n-hexanol, methylamyl alcohol, 2-ethylbutanol, n-heptanol, 2-heptanol, 3-heptanol, n-octanol, 2-octanol, 2-ethylhexanol, 3,5,5-trimethylhexanol, nonanol, n-decanol, undecanol, n-decanol, trimethylnonylalcohol, tetradecanol, heptadecanol, cyclohexanol, and 2-methylcyclohexanol; polyvalent alcohols, for example, ethylene glycol, diethylene glycol, 3-methyl-1,3-butanediol, triethylene glycol, dipropylene glycol, 1,3-propanediol, 1,3-butanediol, 1,5-pentanediol, 3-methyl-1,5-pentanediol, hexylene glycol, and octylene glycol; hydrocarbons, for example, hexane, isohexane, heptane, octane, nonane, decane, cyclohexane, methylcyclohexane, ethylcyclohexane, toluene, xylene, kerosene, and solvent naphtha; ester compounds, for example, butyl formate, isobutyl formate, isoamyl formate, propyl acetate, butyl acetate, isopropyl acetate, isobutyl acetate, isoamyl acetate, methyl propionate, ethyl propionate, propyl propionate, isobutyl propionate, isoamyl propionate, methyl butyrate, ethyl butyrate, propyl butyrate, methyl isobutyrate, ethyl isobutyrate, propyl isobutyrate, methyl valerate, ethyl valerate, propyl valerate, methyl isovalerate, ethyl isovalerate, propyl isovalerate, methyl trimethylacetate, ethyl trimethylacetate, propyl trimethylacetate, methyl caproate, ethyl caproate, propyl caproate, methyl caprylate, ethyl caprylate, propyl caprylate, methyl laurate, ethyl laurate, butyl laurate, methyl myristate, isopropyl myristate, ethyl palmitate, isopropyl palmitate, 2-ethylhexyl palmitate, 2-ethylhexyl stearate, isohexadecyl stearate, methyl oleate, ethyl oleate, and butyl oleate; methyl isopropyl ether, ethyl ether, ethyl propyl ether, ethyl butyl ether, isopropyl ether, butyl ether, hexyl ether, 2-ethylhexyl ether, glycol ethers, for example, ethylene glycol monohexyl ether, ethylene glycol mono-2-ethylbutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monobutyl ether, propylene glycol monomethyl ether, propylene glycol monoethyl ether, propylene glycol monopropyl ether, propylene glycol monobutyl ether, propylene glycol tert-butyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monobutyl ether, and tetrapropylene glycol monobutyl ether; glycol diethers, for example, ethylene glycol dimethyl ether, diethylene glycol dimethyl ether, diethylene glycol butyl methyl ether, diethylene glycol diethyl ether, diethylene glycol ethyl methyl ether, diethylene glycol isopropyl methyl ether, triethylene glycol dimethyl ether, triethylene glycol butyl methyl ether, tetraethylene glycol dimethyl ether, polyethylene glycol dimethyl ether, propylene glycol dimethyl ether, dipropylene glycol dimethyl ether, and tripropylene glycol dimethyl ether; heavy aromatic naphtha, petroleum distillate, and water.

In the case where the composition of the present invention contains a solvent, from the viewpoints of being a liquid state at normal temperature, and having a high boiling point and a low reactivity with the aldehyde and the amine, the solvent is preferably a hydrocarbon, such as octane, nonane, decane, methylcyclohexane, ethylcyclohexane, toluene, xylene, kerosene, or solvent naphtha; an ester compound, such as, methyl caprylate, ethyl caprylate, propyl caprylate, methyl laurate, ethyl laurate, butyl laurate, methyl myristate, isopropyl myristate, ethyl palmitate, isopropyl palmitate, 2-ethylhexyl palmitate, 2-ethylhexyl stearate, isohexadecyl stearate, methyl oleate, ethyl oleate, or butyl oleate; a glycol diether, such as diethylene glycol dimethyl ether, diethylene glycol butyl methyl ether, diethylene glycol diethyl ether, diethylene glycol ethyl methyl ether, diethylene glycol isopropyl methyl ether, triethylene glycol dimethyl ether, triethylene glycol butyl methyl ether, tetraethylene glycol dimethyl ether, polyethylene glycol dimethyl ether, propylene glycol dimethyl ether, dipropylene glycol dimethyl ether, or tripropylene glycol dimethyl ether, and from the viewpoint of solubility, the solvent is more preferably kerosene, solvent naphtha, methyl laurate, or diethylene glycol dimethyl ether, and further preferably diethylene glycol dimethyl ether. When the composition of the present invention contains a solvent, the aldehyde can be kept stably and the composition is excellent in removal efficiency of a sulfur-containing compound.

The total content of the aldehyde and the amine having a pKa value of the conjugate acid in water at 25° C. of 11.3 or higher in the active components of the composition of the present invention is preferably 30 to 100% by mass, more preferably 60 to 100% by mass, further preferably 80 to 100% by mass, and still further preferably 90 to 100% by mass from the viewpoint of removal efficiency of a sulfur-containing compound.

Wherein, the active components refer to components excluding a solvent.

When the composition of the present invention contains a solvent, from the viewpoint of maintaining removal efficiency of a sulfur-containing compound and stably keeping the aldehyde in the composition, the content of the solvent in the composition is preferably 10 to 95% by mass, further preferably 30 to 95% by mass, and still further preferably 40 to 95% by mass.

The method of producing the composition of the present invention is not limited, and examples thereof include (I) a method in which the aldehyde and the amine having a pKa value of 11.3 or higher, and further, as required, the aforementioned optional component are each individually added to the liquid that is subject to the use of the composition of the present invention, and mixed in the liquid, (II) a method in which the amine having a pKa value of 11.3 or higher is previously added to the aldehyde before contact with the liquid or the like, and further, as required, the optional component, such as a solvent, is added and the components are mixed, and (III) a method in which the aldehyde and the amine having a pKa value of 11.3 or higher, and further, as required, the optional component are previously mixed before contact with the liquid or the like.

In the composition of the present invention, the aldehyde and the amine only have to be in a mixed state at the time of contact with at least one of a liquid and gas containing a sulfur-containing compound that is subject to the use of the composition of the present invention, and from the viewpoint of handleability, the composition is preferably previously formed before addition to the liquid or the like that is subject to the use of the composition of the present invention as in the methods (II) and (III).

Although the composition of the present invention is suitably in a liquid form, it may be properly supported on a carrier or the like into a solid form, such as a powder or granule form according to the use mode for removing a sulfur-containing compound contained in at least one of the liquid and gas.

In removing a sulfur-containing compound contained in at least one of a liquid and gas with the composition of the present invention, the at least one of the liquid and gas may be brought into contact with the composition of the present invention. Specific examples of the preferred embodiments with respect to the method of removing a sulfur-containing compound include (i) a method in which the composition of the present invention in a sufficient amount for removing the sulfur-containing compound is added to at least one of a liquid and gas containing the sulfur-containing compound; (ii) a method in which a gas (for example, a hydrocarbon) containing the sulfur-containing compound is allowed to flow through a vessel filled with the composition of the present invention; (iii) and a method in which the composition of the present invention is injected in a mist form into a gas containing the sulfur-containing compound.

In removing a sulfur-containing compound contained in at least one of a liquid and gas with the composition of the present invention, the at least one of the liquid and gas may be brought into contact with the composition of the present invention such that the amount of the aldehyde contained in the composition of the present invention is preferably 0.1 to 5,000 parts by mass, and more preferably 2 to 1,000 parts by mass based on 1 part by mass of the sulfur-containing compound contained in the liquid or gas. For example, in the method (ii) in which the gas containing the sulfur-containing compound is allowed to flow through a vessel filled with the composition of the present invention as described above, the amount of the composition of the present invention used may be adjusted so that the amount of the aldehyde used falls within the above range based on 1 part by mass of the sulfur-containing compound in the whole amount of the flowing gas. In removing a sulfur-containing compound contained in both of a gas and a liquid, the amount of the composition of the present invention used may be adjusted so that the amount of the aldehyde used falls within the above range based on 1 part by mass of the whole amount of the sulfur-containing compound contained in both of the gas and the liquid.

Although the temperature at which the at least one of a liquid and gas is brought into contact with the composition of the present invention is not limited, the temperature is preferably in the range of −30° C. to 150° C., and more preferably in the range of 0° C. to 130° C.

After bringing the at least one of a liquid and gas into contact with the composition of the present invention, the composition after contact and the liquid and gas after contact may be separated from each other, as required. In particular, even in the case where the composition after contact and the gas after contact can be easily separated as in the aforementioned method (ii) in which a gas (for example, a hydrocarbon) containing a sulfur-containing compound is allowed to flow through a vessel filled with the composition of the present invention or in the case of removal of a sulfur-containing compound in a liquid, such a separation method can also be adopted, for example, when phase separation between the composition after contact and the liquid after contact is possible. In this way, the content of a sulfur-containing compound in a liquid or a gas can be decreased from the initial amount, and the quality of the liquid or gas can be enhanced.

As a more specific mode in removing a sulfur-containing compound contained in at least one of a liquid and gas with the composition of the present invention, the following can be exemplified. That is, in removing a sulfur-containing compound in water with the composition of the present invention, for example, a means for injecting the composition of the present invention into a water tank in a sewage treatment plant or the like can be adopted.

In removing a sulfur-containing compound in a hydrocarbon with the composition of the present invention, in the case where the hydrocarbon is a liquid, the composition can be added by a known means, such as injection into a storage tank thereof, a pipeline for transportation, a distillation tower for refinement, or the like. In the case where the hydrocarbon is a gas, a means of placing the composition of the present invention so that the composition comes into contact with the gas as described above, or a means of allowing the gas to pass through an absorption tower filled with the composition of the present invention, can be taken.

The embodiments of the present invention are described above. However, the present invention is not limited to the embodiments, and covers all the embodiments included in the concept and claims of the present invention, and the embodiments can be variously modified in the scope of the present invention.

EXAMPLES

The present invention will be described in more detail below with reference to examples. However, the present invention is not limited to the examples.

Various materials used in Examples and Comparative Examples are shown below.

<Hydrocarbon>
  Kerosene: manufactured by Wako Pure Chemical Industries, Ltd. density=0.8 g/cm$^3$
  Crude oil: manufactured by Japan Petroleum Exploration Co., Ltd., density=0.8 g/cm$^3$
<Sulfur-Containing Compound>
  n-Butyl mercaptan (BuSH): manufactured by Wako Pure Chemical Industries, Ltd., density=0.83 g/cm$^3$
  Ethyl mercaptan (EtSH): manufactured by Wako Pure Chemical Industries, Ltd., density=0.84 g/cm$^3$
<Aldehyde>
  Senecioaldehyde (SAL): synthesized from prenol in accordance with a method described in JP 60-224652 A (purity: 98.1% by mass), density=0.87 g/cm$^3$
  Acrolein: manufactured by Tokyo Chemical Industry Co. Ltd., purity>95% by mass, containing hydroquinone as a stabilizer, density=0.84 g/cm$^3$
  Citral: synthesized from prenol in accordance with JP 52-148009 A (purity: 97.0% by mass), density=0.89 g/cm$^3$
<Amine>
  1,8-Diazabicyclo[5.4.0]-7-undecene (DBU): manufactured by Wako Pure Chemical Industries, Ltd., pKa=11.5, density=1.02 g/cm$^3$
  1,1,3,3-Tetramethylguanidine (TMG): manufactured by Wako Pure Chemical Industries, Ltd., pKa=13.6, density=0.92 g/cm$^3$
  Triethylamine: manufactured by Wako Pure Chemical Industries, Ltd., pKa=10.8, density=0.73 g/cm$^3$
  N,N,N',N'',N''-Pentamethydiethylenetriamine (PMDETA): manufactured by Wako Pure Chemical Industries, Ltd., pKa=9.1, density=0.83 g/cm$^3$
<Solvent>
  Solvent naphtha: manufactured by Sankyo Chemical Co. Ltd. (Solvent #100), density=0.88 g/cm$^3$
  Diethylene glycol dimethyl ether: manufactured by Wako Pure Chemical Industries, Ltd., density=0.94 g/cm$^3$ methyl laurate: manufactured by Wako Pure Chemical Industries, Ltd., density=0.87 g/cm$^3$

Example 1

In a 100 mL three-neck flask, 50 mL of kerosene was put and 50 µL (1000 ppm by volume, 0.46 mmol) of BuSH was added thereto to obtain a kerosene solution containing a sulfur-containing compound.

Next, 250 µL (2.59 mmol) of SAL and 250 µL (1.71 mmol) of DBU were added to the kerosene solution, and the solution was stirred at room temperature (20° C.±5° C., the same applies hereinafter) and at 800 rpm to perform a sulfur-containing compound removal reaction.

After 1-day reaction, the mercaptan concentration of the liquid phase in the three-neck flask was measured. Then, the mercaptan concentration was 122 ppm by volume and the removal rate was 88%.

The mercaptan concentration of the liquid phase was measured using a calibration curve method by gas chromatography. The gas chromatography was performed under the following conditions.
(Gas Chromatography)
Analyzer: GC-SCD (manufactured by Agilent Technologies Japan, Ltd.)
Detector: sulfur chemiluminescence detector (SCD)
Column: DB-sulfur SCD (length: 60 m, thickness: 4.2 µm, inner diameter: 0.32 mm) (manufactured by Agilent Technologies Japan, Ltd.)
Analytical conditions: inject. temp. 250° C., detect. temp. 250° C.
Temperature rise condition: 35° C. (kept for 3 minutes) (raised at 10° C./min)→250° C. (kept for 15 minutes)
Internal Standard Substance: diphenyl sulfide

Comparative Example 1

A sulfur-containing compound removal reaction was performed in the same manner as in Example 1 except that no amine was used. The result is shown in Table 1.

Example 2 and Comparative Examples 2 and 3

A sulfur-containing compound removal reaction was performed in the same manner as in Example 1 except that amines shown in Table 1 were respectively used in place of DBU. The result is shown in Table 1.

Example 3

A sulfur-containing compound removal reaction was performed in the same manner as in Example 1 except that the amount of DBU added was changed from 250 µL to 25 µL (0.17 mmol). The result is shown in Table 1.

Example 4

A sulfur-containing compound removal reaction was performed in the same manner as in Example 3 except that acrolein was used in place of SAL and the reaction time was changed from 1 day to 2 hours. The result is shown in Table 1.

Comparative Example 4

A sulfur-containing compound removal reaction was performed in the same manner as in Example 4 except that no amine was used and the reaction time was changed from 2 hours to 1 day. The result is shown in Table 1.

Example 5

A sulfur-containing compound removal reaction was performed in the same manner as in Example 3 except that EtSH was used in place of BuSH. The result is shown in Table 1.

Example 6

A sulfur-containing compound removal reaction was performed in the same manner as in Example 3 except that crude oil was used in place of kerosene. The result is shown in Table 1.

TABLE 1

| | | Sulfur-containing compound Incorporated | Aldehyde Incorporated | Amine | | | Evaluation | |
|---|---|---|---|---|---|---|---|---|
| | Hydrocarbon | amount (50 µL) | amount (250 µL) | Type | pKa | Incorporated amount (µL) | Reaction time | Removal rate (%) |
| Example 1 | kerosene | BuSH | SAL | DBU | 11.5 | 250 | 1 day | 88 |
| Comparative Example 1 | kerosene | BuSH | SAL | None | | | 1 day | <10 |
| Example 2 | kerosene | BuSH | SAL | TMG | 13.6 | 250 | 1 day | 60 |
| Comparative Example 2 | kerosene | BuSH | SAL | triethylamine | 10.8 | 250 | 1 day | <10 |
| Comparative Example 3 | kerosene | BuSH | SAL | PMDETA | 9.1 | 250 | 1 day | 10 |
| Example 3 | kerosene | BuSH | SAL | DBU | 11.5 | 25 | 1 day | 29 |
| Example 4 | kerosene | BuSH | acrolein | DBU | 11.5 | 25 | 2 hours | 99 |
| Comparative Example 4 | kerosene | BuSH | acrolein | None | | | 1 day | 15 |
| Example 5 | kerosene | EtSH | SAL | DBU | 11.5 | 25 | 1 day | 43 |
| Example 6 | crude oil | BuSH | SAL | DBU | 11.5 | 25 | 1 day | 73 |

Example 7

In a 100 mL three-neck flask, 50 mL of crude oil was put and 30 µL (596 ppm by mass, 0.36 mmol) of EtSH was added thereto to obtain a crude oil solution containing a sulfur-containing compound.

Next, 300 µL (2.59 mmol as SAL) of a mixture composed of 80% by mass of SAL which was separately prepared and 20% by mass of DBU was added to the crude oil solution and the solution was stirred at room temperature at 800 rpm to perform a sulfur-containing compound removal reaction.

After a 7-hour reaction, the mercaptan concentration of the liquid phase in the three-neck flask was measured. Then, the mercaptan concentration was 145 ppm by mass and the removal rate was 76%.

As shown in Examples 1 to 7, it was confirmed that when an aldehyde and an amine having a pKa value of 11.3 or higher were used in combination, mercaptan (a sulfur-containing compound) in the liquid was able to be removed more efficiently as compared with the case of using an aldehyde alone (Comparative Examples 1 and 4) or the case of using an aldehyde and an amine having a pKa value less than 11.3 in combination (Comparative Examples 2 and 3).

Example 8

In a 100 mL three-neck flask, 50 mL of crude oil was put and hydrogen sulfide gas (hydrogen sulfide: 99.99% by volume) was allowed to flow at a rate of 10 mL/min for 45 minutes to obtain a crude oil solution with hydrogen sulfide absorbed. The crude oil solution was transferred to another 100 mL three-neck flask, and was diluted with crude oil into 50 mL. After dilution, the hydrogen sulfide concentration of the liquid phase in the diluted crude oil solution was 465 ppm by mass (0.53 mmol).

Next, 75 µL (0.62 mmol as SAL) of a mixture composed of 91% by mass of SAL which was separately prepared and 9% by mass of DBU was added to the diluted crude oil solution, and the solution was stirred at room temperature at 800 rpm in the three-neck flask to perform a sulfur-containing compound removal reaction.

After 3-hour reaction, the hydrogen sulfide concentration of the liquid phase in the three-neck flask was measured. Then, the concentration was 303 ppm by mass and the removal rate was 35%.

The hydrogen sulfide concentration of the liquid phase was measured using a calibration curve method by a gas chromatography as in the mercaptan concentration.

As shown in Example 8, it was confirmed that the case of combination use of an aldehyde and an amine having a pKa value of 11.3 or higher was also excellent in the removal rate of hydrogen sulfide in the liquid.

Example 9

In a 100 mL three-neck flask, 30 mL of kerosene was added, a mixed gas composed of 1% by volume of hydrogen sulfide and 99% by volume of nitrogen was allowed to flow at a rate of 50 mL/min while stirring at 800 rpm to substitute the gas in the three-neck flask. After 1 hour, flow of the mixed gas was stopped, and after sealing the three-neck flask, the hydrogen sulfide concentration of the gas phase in the three-neck flask was measured. Then, the concentration was 8400 ppm by volume.

Next, to the kerosene solution, 1 g (10.7 mmol as SAL) of a mixture composed of 90% by mass of SAL which was separately prepared and 10% by mass of DBU was added, and the solution was stirred at room temperature at 800 rpm in the three-neck flask to perform a sulfur-containing compound removal reaction.

After a 30-minute reaction, the hydrogen sulfide concentration of the gas phase in the three-neck flask was measured. Then, the concentration was 0 ppm by volume and the removal rate was 100%.

The hydrogen sulfide concentration in the gas phase was measured using a Kitagawa gas detector tube system (used with a hydrogen sulfide gas detector tube, manufactured by Komyo Rikagaku Kogyo K. K., installed in a gas aspirating pump "AP-20"). Specifically, 4 mL of a gas sample was first taken from the gas phase in the three-neck flask, and the sample was diluted with 96 mL of air to prepare 100 mL of a measurement sample. Next, the measurement sample was allowed to flow into the gas aspirating pump and the indication of the gas detector tube after 1 minute was observed. Then, the indication was corrected by multiplying the indication by the dilution degree and the corrected value was taken as the hydrogen sulfide concentration of the gas phase.

Example 10

A sulfur-containing compound removal reaction was performed in the same manner as in Example 9 except that a mixture composed of 90% by mass of SAL and 10% by mass of DBU was changed to a mixture (5.91 mmol as citral) composed of 90% by mass of citral and 10% by mass of DBU and a reaction time was changed from 30 minutes to 1 hour.

In Example 10, the hydrogen sulfide concentration of the gas phase before the start of the reaction was 4800 ppm by volume, and the hydrogen sulfide concentration of the gas phase after a 1-hour reaction was 140 ppm by volume and the removal rate was 97%.

As shown in Examples 9 and 10, it was confirmed that combination use of an aldehyde and an amine having a pKa value of 11.3 or higher enables efficient removal of hydrogen sulfide (a sulfur-containing compound) in a liquid and gas.

Reference Example 1

Into a 9 mL sample tube, 2 g of kerosene was put, and 2 g of a mixture composed of 90% by mass of SAL and 10% by mass of DBU was added thereto and mixed. Then, the mixed liquid had a uniform appearance.

Reference Example 2

An evaluation was performed in the same manner as in Reference Example 1 except for using solvent naphtha in place of kerosene. The resulting mixed liquid had a uniform appearance.

Reference Example 3

An evaluation was performed in the same manner as in Reference Example 1 except for using diethylene glycol dimethyl ether in place of kerosene. The resulting mixed liquid had a uniform appearance.

Reference Example 4

An evaluation was performed in the same manner as in Reference Example 1 except for using methyl laurate in place of kerosene. The resulting mixed liquid had a uniform appearance.

Reference Example 5

Into a 500 mL eggplant flask, 360 g of diethylene glycol dimethyl ether was put, and 40 g of a mixture composed of 90% by mass of SAL and 10% by mass of DBU was added thereto and mixed. Then, the mixed liquid had a uniform appearance.

Reference Example 6

The mixed liquid obtained in Reference Example 5 was stored at room temperature for 7 days, and was then analyzed for the content of SAL by gas chromatography. Then, the residual amount was 97% of the initial value.

Example 11

Into a 250 mL gas wash bottle (with sintered filter), 200 mL of the mixed liquid obtained in Reference Example 5 was put, and a mixed gas composed of 0.1% by volume of hydrogen sulfide and 99.9% by volume of nitrogen was allowed to flow at a rate of 100 mL/min. After 1 hour flow, the hydrogen sulfide concentration in the gas phase at the outlet of the gas wash bottle was measured. Then, the concentration was 7 ppm by volume and the removal ratio was 99%.

As shown in Reference Examples 1 to 6, it can be seen that, even when the composition of the present invention contains the solvent, a uniform solution can be given and the solution can be stored without degradation of the aldehyde. As shown in Example 11, it can be seen that the composition containing a solvent added thereto is also excellent in removal efficiency of a sulfur-containing compound.

The invention claimed is:

1. A composition, comprising:
an aldehyde; and
at least one of an amine of formula (1) and an amine of formula (2):

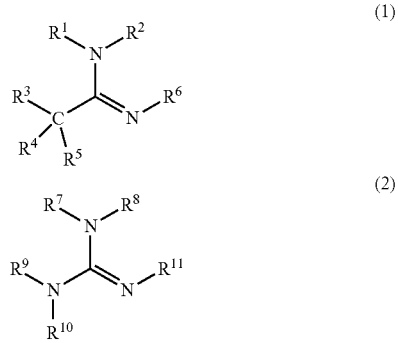

wherein
$R^1$ to $R^{11}$ are each independently a hydrogen atom or an alkyl group having 1 to 5 carbon atoms, provided that $R^1$, $R^2$, $R^7$, and $R^8$ may be connected to $R^3$, $R^6$, $R^9$, and $R^{11}$, respectively, to form an alkylene group having 2 to 6 carbon atoms;
a pKa value of the conjugate acid of the amine of formula (1) and the amine of formula (2) is 11.3 or higher in water at 25° C., and
the composition is suitable for removing a sulfur-containing compound selected from the group consisting of hydrogen sulfide and an —SH group-containing compound from at least one of a liquid and gas.

2. The composition according to claim 1, wherein the compound of formula (1) is at least one of 1,8-diazabicyclo[5.4.0]-7-undecene (DBU) and 1,5-diazabicyclo[4.3.0]-5-nonene (DBN).

3. The composition according to claim 1, wherein the compound of formula (2) is at least one selected from the group consisting of guanidine, 1,1,3,3-tetramethylguanidine (TMG), 1,5,7-triazabicyclo[4.4.0]dec-5-ene (TBD), and 7-methyl-1,5,7-triazabicyclo[4.4.0]dec-5-ene (MTBD).

4. The composition according to claim 1, wherein the aldehyde is an α, β-unsaturated aldehyde.

5. The composition according to claim 4, wherein the α, β-unsaturated aldehyde is at least one selected from the group consisting of acrolein, senecioaldehyde, and citral.

6. The composition according to claim 1, wherein each of the liquid and gas comprises a hydrocarbon.

7. The composition according to claim 1, wherein each of the liquid and gas is at least one selected from the group consisting of natural gas, liquefied natural gas (LNG), liquefied petroleum gas (LPG), sour gas, dry gas, wet gas, oil field gas, associated gas, tail gas, dimethyl ether, crude oil, naphtha, heavy aromatic naphtha, gasoline, kerosene, diesel oil, light oil, lubricating oil, heavy oil, A-heavy oil, B-heavy oil, C-heavy oil, jet fuel oil, FCC slurry, asphalt, condensate, bitumen, extra heavy oil, tar, gas to liquid (GTL), coal to liquid (CTL), asphaltene, aromatic hydrocarbons, alkylates, base oil, kerogen, coke, black oil, synthetic crude oil, reformed gasoline, isomerate gasoline, regenerated heavy oil, residual oil, clean oil, raffinate, wax, biomass fuel, biomass to liquid (BTL), biogasoline, bioethanol, bio-ETBE, and biodiesel.

8. A method of removing a sulfur-containing compound contained in at least one of a liquid and gas,
the sulfur-containing compound being at least one selected from the group consisting of hydrogen sulfide and an —SH group-containing compound,
the method comprising bringing the at least one of the liquid. and gas into contact with the composition according to claim 1.

9. The method according to claim 8, wherein the sulfur-containing compound is brought into contact with the composition in the range of −30° C. to 150° C.

* * * * *